Aug. 20, 1963 W. DE HAAN 3,101,186
VEHICLE SEAT CONSTRUCTION
Filed Oct. 5, 1961 2 Sheets-Sheet 1

INVENTOR.
Wolbert DeHaan
BY
J. L. Carpenter
ATTORNEY

Aug. 20, 1963 W. DE HAAN 3,101,186
VEHICLE SEAT CONSTRUCTION
Filed Oct. 5, 1961 2 Sheets-Sheet 2

INVENTOR.
Wolbert DeHaan
BY
J. L. Carpenter
ATTORNEY

3,101,186
VEHICLE SEAT CONSTRUCTION
Wolbert De Haan, Farmington, Mich., assignor to General Motors Corporation, Detroit, Mich., a corporation of Delaware
Filed Oct. 5, 1961, Ser. No. 143,172
4 Claims. (Cl. 248—378)

This invention relates to a vehicle seat and more particularly to a cushioning or shock absorbing device for an automobile seat.

One object of this invention is to provide a simple and inexpensive cushioning device to absorb vibrations which are transmitted to a vehicle seat by the frame or chassis thereof. Another object of this invention is to provide a pivotally mounted vehicle seat that gradually assumes an adjusted position in response to the weight of an individual seated thereon. An additional object of the invention is to provide a pivoted vehicle seat which is vertically positionable by cushioning mechanism. Still another object of this invention is to provide combined vehicle seat cushioning and positioning apparatus which is adjustable to provide for variable vehicle seat positioning.

In accordance with the foregoing objects, the invention comprises a springless vehicle seat that is cushioned and variably positioned by elastic means controllably associated with a rotatable shaft about which the seat is pivotally supported. Heretofore, autmobiles have been constructed with a wide variety of shock absorbing devices adapted to cushion the contraction and expansion of vehicle suspensions by the provision of additional spring means directly interposed between the vehicle seat and the vehicle floor. The present device substantially eliminates oscillation and vibration of the seat due to vibrations of the vehicle and due to secondary vibrations often caused in conventional spring supported vehicle seats.

Additional objects and advantages will be apparent by reference to the following specification and the accompanying drawings wherein.

Figure 1:
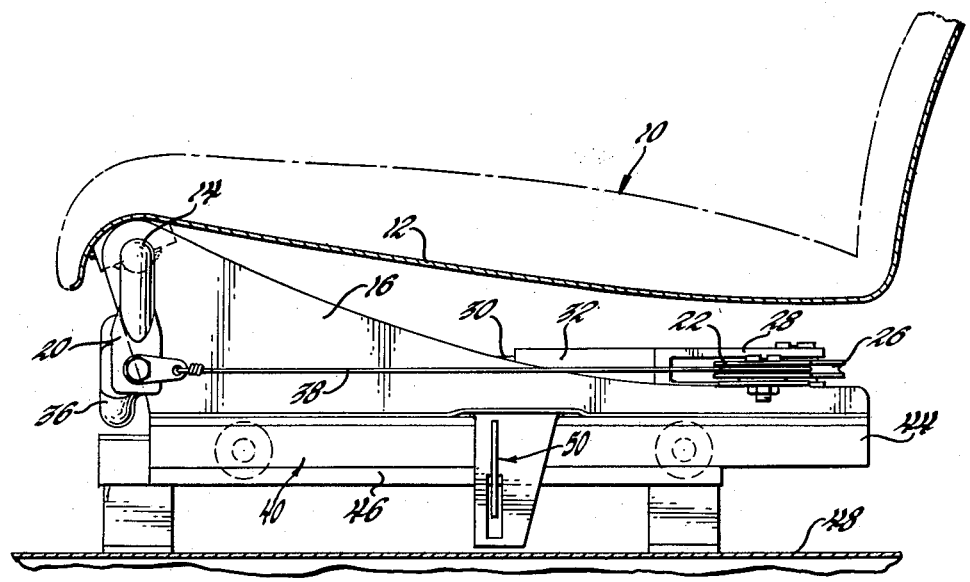
FIGURE 1 is a side elevational view of an illustrative embodiment of the present invention.
Figure 2:
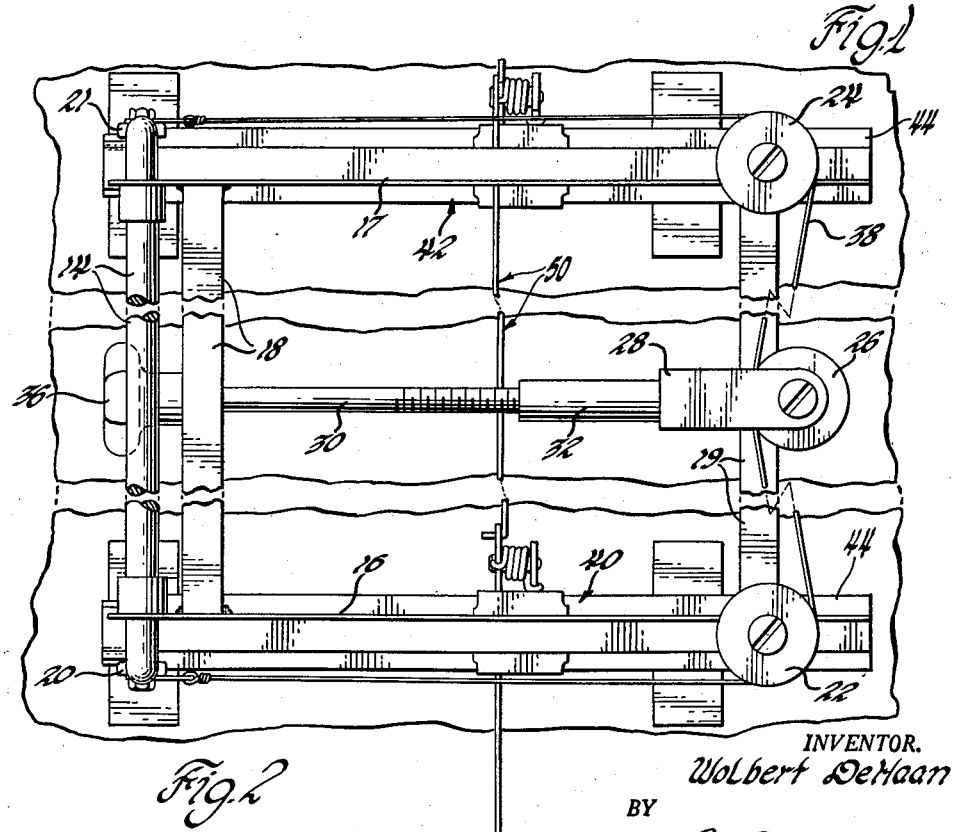
FIGURE 2 is a plan view of the apparatus shown in FIGURE 1.

Referring now to the drawings, a springless seat 10 formed from cotton and hair padding or other suitable materials is supported by a seat panel 12 or other conventional seat frame structures. The front end of the seat is welded or otherwise suitably secured to a transversely extending pivot shaft 14 which is rotatably supported above the vehicle floor by parallel spaced support brackets 16, 17 of a support frame formed by cross braces 18, 19. Control arms 20, 21 are formed on the ends of the pivot shaft 14 and extend downwardly from the pivotal axis of the shaft 14. A pair of pulleys 22, 24 are rotatably secured to the support brackets 16, 17 rearwardly of the pivot shaft 14. In one form of the invention, an adjusting pulley 26 is rotatably mounted in a clevis block 28 which is slidably mounted on the rear cross brace 19. An adjusting screw 30 is operably connected to a conventional actuator 32 and is rotatably supported by the front cross brace 18. A control handle 36 extends outwardly from the support frame for manipulation by an occupant of the seat to move the pulley 26 forwardly or rearwardly. An elastic tension cable 38 is suitably secured to the extremities of the control arms 20, 21 and extends around the pulleys 22, 24. In the assembled position, the tension cable is tautly drawn around the pulleys 22, 24 by engagement with pulley 26 so that the control arms 20, 21 are held in their downwardly extending positions to maintain the seat in a substantially horizontal plane. The tension cable 38 is, however, sufficiently elastic to allow the seat to be pivoted downwardly in response to loads applied thereto. Vertical height of the seat may be adjusted by the seat occupant by moving the pulley 26 and increasing or decreasing the tension of the cable 38. The support frame may be mounted directly to a vehicle floor or to spaced seat adjuster units 40, 42 comprising an upper channel 44 and a lower channel 46 which is secured to a floor pan 48. Conventional adjuster control mechanism 50 extends between the units 40, 42.

Figure 3:
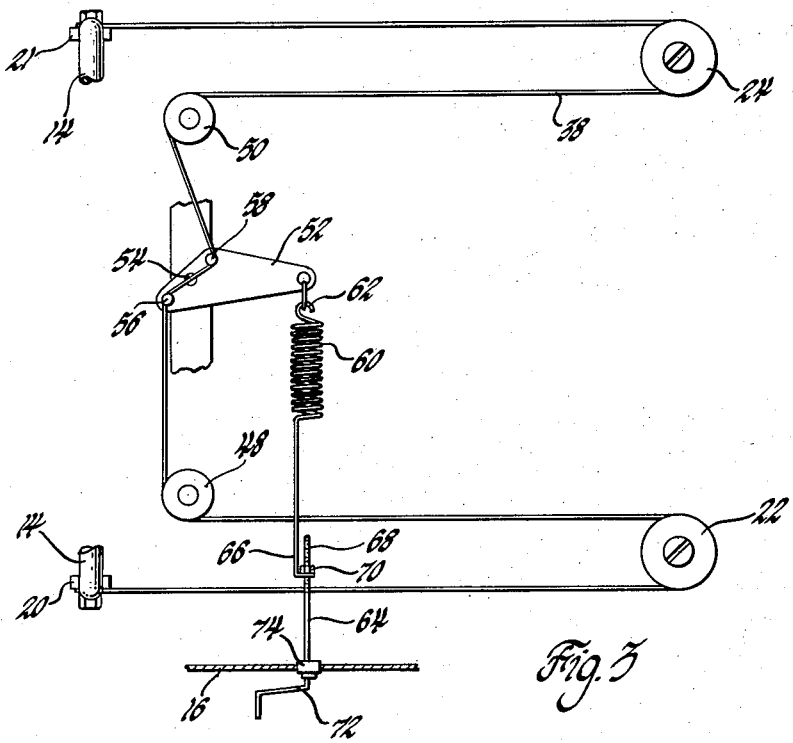
FIGURE 3 is a partial plan view of alternative adjusting means.

An alternative adjusting arrangement is shown in FIGURE 3 and comprises an additional set of pulleys 48, 50 which provide a better force alignment and serve to increase elastic displacement of the cable 38. Cable tension control means in the form of a control lever 52 is pivotally secured to the frame at 54 for pivotal displacement in a substantially horizontal plane. A pair of pulley rollers 56, 58 are secured to the control lever 52 and extend outwardly therefrom. The rollers are normally oppositely spaced, forwardly and rearwardly, of the pivot 54. The cable 38 is wound around the rollers so that clockwise movement of the control lever decreases tensions on the cable and counterclockwise movement increases tensions thereon. A spring element 60 is fastened to the control lever at one end 62 and to an adjustment crank 64 at the other end 66. The adjustment crank is rotatably supported in the bracket 16 and has a threaded portion 68 which is adjustably associated with a spring control collar 70. A handle portion 72 of the adjustment crank extends outwardly beyond the seat pan for convenient operation by a seat occupant. The crank is axially restrained by a collar 74 so that the cable tension load is transferred to the support frame.

In operation, in the unloaded condition the seat 10 is held in a substantially horizontal position by the effect of the force of the tension cable on the control arms 20, 21; that is, the tendency of the seat to rotate with the pivot shaft 14 relative to the support brackets 16, 17, is prevented by the restraining action of the tension cable 38 on the control arms 20, 21. When a vehicle occupant sits on the seat and increases the force tending to rotate the seat, the tension cable will be stretched within its elastic limit to allow for a limited rotative movement of the seat relative to the support brackets. The amount of rotation of the seat can be controlled by increasing or decreasing the tension on the cable 38 by means of the seat adjuster mechanism 30, 32. If the cable is additionally stretched by movement of the pulley 26 toward the front of the seat, the control arms 20, 21 will be rotated rearwardly and the vehicle seat will be rotated upwardly. If the tension on the cable is lessened by movement of the pulley 26 toward the rear of the seat, the seat will be rotated downwardly in accordance with the ability of the control arms 18, 20 to move forwardly against the restraining force of the tension cable 38.

Figure 4:
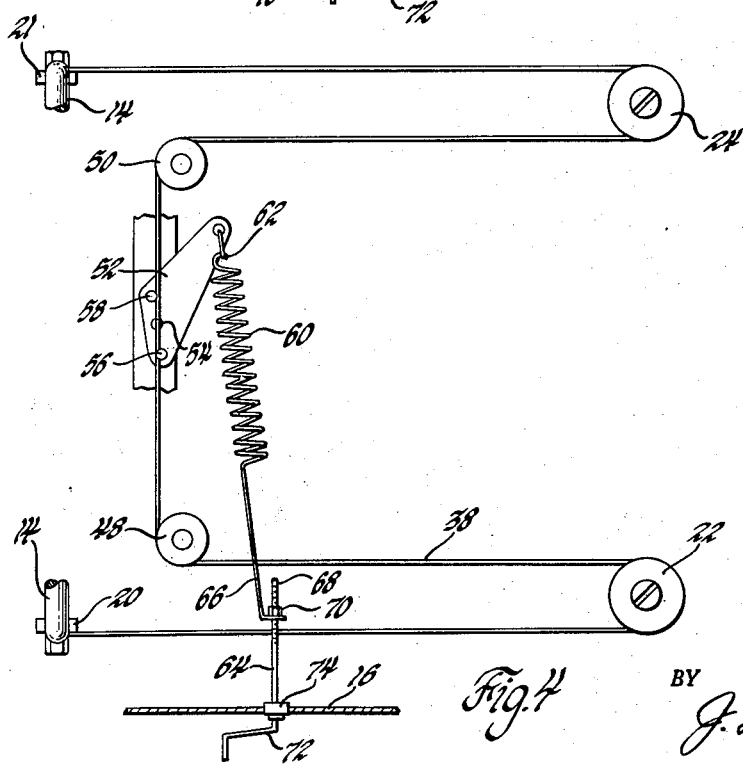
FIGURE 4 is a partial plan view of the means shown in FIGURE 3 in another position.

The operation of the apparatus shown in FIGURE 3 is basically similar to the aforedescribed operation. In addition, spring 60 supplements the lower elastic cushioning range of cable 38 during an initial loading of the seat. The initial loading of spring 60 can be varied by rotation of crank 64. When the seat 12 is downwardly displaced under load, the tension cable is stretched and control lever 52 is rotated counterclockwise about pivot 54. Spring element 60 reacts against the movement of the control lever 52 until the lever is moved to the position shown in FIGURE 4 whereat the cable 38 no longer exerts any force thereon through rollers 56, 58. At such time, further loading of the seat is entirely supported by the elasticity of cable 38.

Although it is advantageous to provide a single tension cable for cushioning and positioning the vehicle seat, elastic means might, in some applications, be individually associated with each of the control arms 20, 21. Another modification of the preferred embodiment might include a centrally located elastic medium to control the rotative position of the seat member in the aforedescribed manner. In addition, various other modifications are comprehended which are intended to be included within the scope of this invention as defined by the appended claims, except as limited by the prior art.

I claim:

1. In combination with an automobile seat comprising spaced support brackets for said seat fixedly secured to the floor of the automobile, hinge connections between said supports and the front edge of said seat to permit pivotal movement of said seat thereabout, a plurality of cable supports spaced from and located rearwardly of said hinge connections, an elastic tension cable having its ends fixed to said seat adjacent the front edge thereof and spaced from said hinge connections, said cable extending around said cable supports to resiliently oppose movement of said seat about said hinge connections in one direction.

2. In a seat, spaced support members, a control bar rotatably supported by said support members, the front edge of said seat being fixedly secured to said control bar, downwardly extending arms fixedly secured to the end portions of said control bar, cable support means fixedly secured beneath said seat rearwardly of said control bar, a flexible cable associated with said cable support means, the ends of said cable being fastened to said downwardly extending arms whereby, as said seat is loaded and rotated rearwardly and downwardly about said support members, said downwardly extending arms are rotated forwardly and upwardly to tension said cable and limit downward movement of said seat.

3. Vehicle seat supporting apparatus for cushioning and variably vertically positioning a vehicle seat comprising; spaced support brackets fixedly secured beneath said seat, a shaft rotatably mounted on said brackets, the front edge of said seat being fastened to said control shaft and being rotatable therewith, spaced depending control arms fixedly connected to said shaft and rotatable therewith, elastic tension means fixed to and extending between said control arms and movable therewith, and means spaced rearwardly of said shaft and opposing movement of said tension means during rotation of the shaft accompanying downward movement of the seat under load, whereby said downward seat movement is resiliently cushioned.

4. In combination with an automobile seat comprising spaced support brackets for said seat fixedly secured to the floor of the automobile, hinge connections between said supports and the front edge of said seat to permit pivotal movement of said seat thereabout, a plurality of cable supports spaced from and located rearwardly of said hinge connections, an elastic tension cable having its ends fixed to said seat adjacent the front edge thereof and spaced from said hinge connections, said cable extending around said cable supports to resiliently oppose movement of said seat about said hinge connections in one direction, said cable having a cable tension control means movable from a controlling position to a non-controlling position, a control lever operatively connected to said control means, and additional cushioning means connected to said control lever to provide additional cushioning for said seat in said controlling position of said control means, said additional cushioning means being inoperative in said non-controlling position.

References Cited in the file of this patent

UNITED STATES PATENTS

| | | |
|---|---|---|
| 562,265 | De Rosetti | Sept. 18, 1894 |
| 2,117,932 | Anker | May 17, 1938 |
| 2,633,897 | Moore | Apr. 7, 1953 |
| 2,953,189 | Barash | Sept. 20, 1960 |

FOREIGN PATENTS

| | | |
|---|---|---|
| 598,458 | Great Britain | Feb. 18, 1948 |